United States Patent
Rastogi

(10) Patent No.: US 9,430,535 B2
(45) Date of Patent: Aug. 30, 2016

(54) METHOD AND APPARATUS FOR NORMALIZING AND PREDICTING TIME SERIES DATA

(71) Applicant: Adobe Systems Inc., San Jose, CA (US)

(72) Inventor: Anubha Rastogi, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 246 days.

(21) Appl. No.: 13/894,001

(22) Filed: May 14, 2013

(65) Prior Publication Data

US 2014/0344226 A1    Nov. 20, 2014

(51) Int. Cl.
| | |
|---|---|
| G06F 7/00 | (2006.01) |
| G06F 17/00 | (2006.01) |
| G06F 17/30 | (2006.01) |
| G06Q 30/02 | (2012.01) |

(52) U.S. Cl.
CPC ..... *G06F 17/30551* (2013.01); *G06Q 30/0202* (2013.01)

(58) Field of Classification Search
CPC ............ G06F 17/3053; G06F 17/30938; G06F 17/30867; G06F 17/30551
See application file for complete search history.

(56) References Cited

U.S. PATENT DOCUMENTS

| | | | |
|---|---|---|---|
| 8,412,714 B2* | 4/2013 | Amer-Yahia et al. ........ 707/748 |
| 2005/0144064 A1* | 6/2005 | Calabria ................ G06Q 30/02 705/14.71 |
| 2005/0222928 A1* | 10/2005 | Steier ..................... G06Q 40/02 705/35 |
| 2007/0055477 A1* | 3/2007 | Chickering et al. .......... 702/182 |
| 2007/0208772 A1* | 9/2007 | Harik ................ G06F 17/30684 |
| 2008/0002873 A1* | 1/2008 | Reeves et al. ................. 382/133 |
| 2009/0150426 A1* | 6/2009 | Cannon ................. G06F 17/246 |
| 2011/0258056 A1* | 10/2011 | Ioffe ...................... G06Q 30/02 705/14.73 |
| 2012/0053970 A1* | 3/2012 | Bhamidipaty et al. ....... 705/7.11 |
| 2012/0143633 A1* | 6/2012 | Salghetti et al. ................ 705/4 |

* cited by examiner

*Primary Examiner* — Susan Chen
(74) *Attorney, Agent, or Firm* — Keller Jolley Preece

(57) ABSTRACT

A computer implemented method and apparatus for normalizing and predicting time series data. The method comprises accessing collected data comprising a plurality of intervals; defining a variation for each interval in the plurality of intervals, wherein each variation is a cost value; clustering the cost values, wherein clustering identifies anomalies in the collected data; correcting the anomalies in the collected data; and creating a set of normalized data from the corrected data.

20 Claims, 13 Drawing Sheets

METHOD AND APPARATUS FOR NORMALIZING AND PREDICTING TIME SERIES DATA

BACKGROUND OF THE INVENTION

1. Field of the Invention

Embodiments of the present invention generally relate to data analysis and, more particularly, to a method and apparatus for normalizing and predicting time series data.

2. Description of the Related Art

Often times large sets of time series data require analysis. Time series data is data that is recorded regularly over time. For example, time series data may be the daily temperature changes of a city, or the daily changes in the stock price of a company. Data analysis can be used to predict data values. However, the quality of the time series data upon which the prediction is based, is crucial for producing accurate predictions.

Data may be contaminated if an error occurred when the data was being recorded. The error could have prevented the data from being properly recorded. It is also possible that the definition of the variable being recorded itself changed. For example, in the case of stock prices, a stock split may have taken place. The data before the stock split is not on the same scale as the data after the stock split. Before any analysis is performed or conclusions made based on the data, the data must first be corrected. Otherwise, one could easily infer or predict a sharply rising or falling trend where one does not actually exist, or one could infer changes in seasonality based on erroneous data.

Noise in data is meaningless data. Noise removal is a technique to correct a set of data containing errors. Conventional noise removal techniques such as median filtering or outlier rejection fail when the variations in the time series data are very large and the number of outliers may be the same or more than the number of inliers.

Therefore, there is a need in the art for a method and apparatus for normalizing and predicting time series data.

SUMMARY OF THE INVENTION

A method and apparatus for normalizing and predicting time series data substantially as shown in and/or described in connection with at least one of the figures, as set forth more completely in the claims.

These and other features and advantages of the present disclosure may be appreciated from a review of the following detailed description of the present disclosure, along with the accompanying figures in which like reference numerals refer to like parts throughout.

Figure 1:
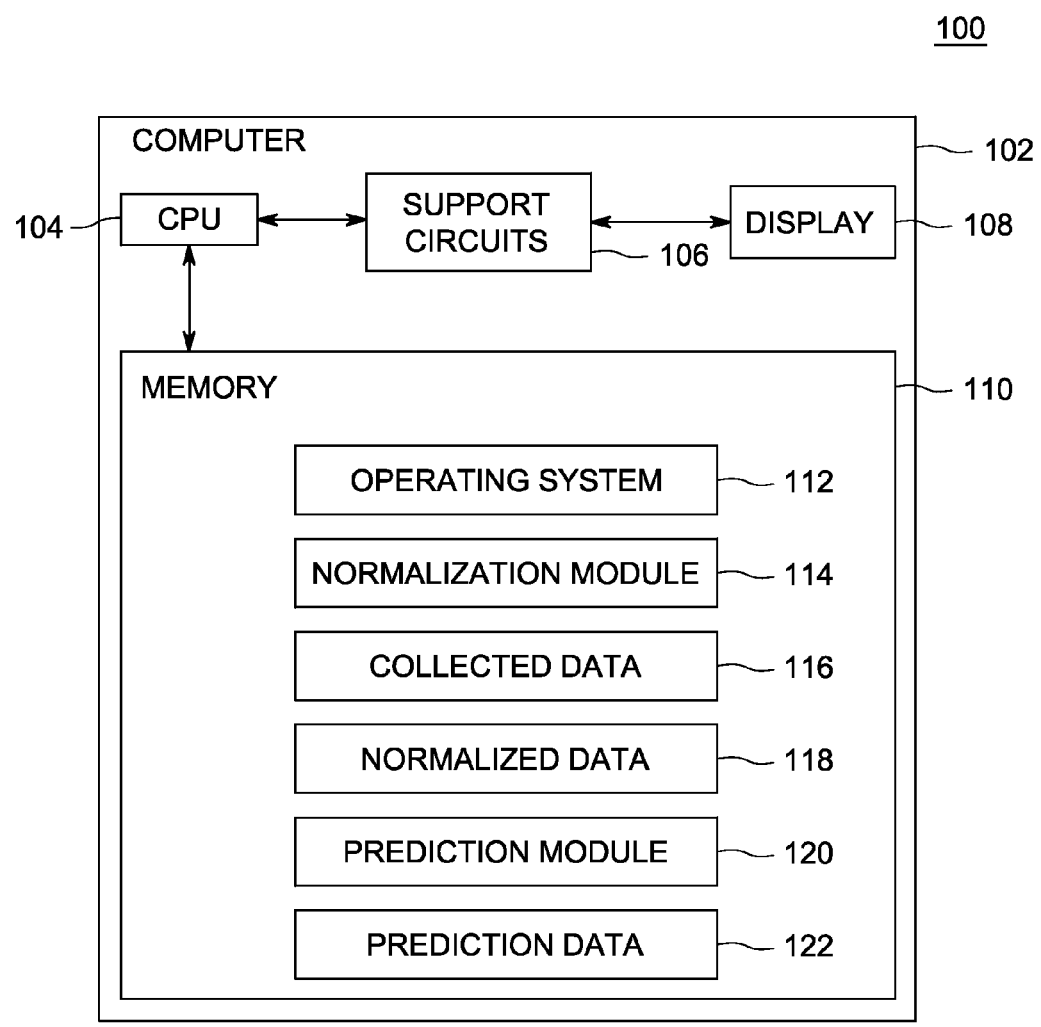
FIG. 1 is a block diagram of an apparatus for normalizing and predicting time series data, according to one or more embodiments.

While the method and apparatus is described herein by way of example for several embodiments and illustrative drawings, those skilled in the art will recognize that the method and apparatus for normalizing and predicting time series data is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for normalizing and predicting time series data defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for normalizing and predicting time series data. The embodiments correct time series data by matching the levels of the data in an interval with an interval of data that is known to contain correct data, while retaining the trend or seasonality found within an interval of data known to contain bad data. The method creates a cost function based on ratios of neighboring data points, clusters these costs and changes the values in the bad clusters using information derived from the good clusters. Normalized data is then recreated from the changed values. The normalized data is used to find trends in the data and then extrapolate the trends to obtain the prediction for the data.

Advantageously, the present invention corrects systematic errors so that a more reasonable analysis can be obtained from the data. The scheme allows for a more reasonable analysis of data. The present invention can be used by any company that uses large amounts of data to forecast future demands, trends, and the like. For example, the present invention may be used for weather forecasting, predicting stock market prices, electricity or water demand and the like. The present invention may also be used in software applications such as ADOBE® AUDITUDE® to use data that is collected by web analytics systems, such as ADOBE® SITECATALYST®. The collected data is used to forecast audience viewership to assist media companies in placing relevant and meaningful advertising effectively. The present invention may be used to detect abnormalities in data as it is being recorded, such that an alarm or report may be sent to address the detected abnormality.

Various embodiments of a method and apparatus for normalizing and predicting time series data are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of an apparatus 100 for normalizing and predicting time series data, according to one or more embodiments. The system 100 includes a computer 102. The computer 102 is a type of computing device (e.g., a desktop computer, laptop, tablet computer, smart phone, and the like). The computer 102 may be a device used for data prediction. The computer 102 includes a Central Processing Unit (CPU) 104, support circuits 106, a display 108, and a memory 110. The CPU 104 may include one or more commercially available microprocessors or microcontrollers that facilitate data processing and storage. The various support circuits 106 facilitate the operation of the CPU 104 and include one or more clock circuits, power supplies, cache, input/output circuits, and the like. The memory 110 includes at least one of Read Only Memory (ROM), Random Access Memory (RAM), disk drive storage, optical storage, removable storage and/or the like.

The memory 110 includes an operating system 112, a normalization module 114, pre-normalized data 116, normalized data 118, a prediction module 120, and prediction data 122. The operating system 112 may include various commercially known operating systems. The normalization module 114 accesses the collected data 116. The collected data 116 may be a large amount of time series data, for example, based on a year's worth of data. The collected data 116 may be received from a web analytics system, such as ADOBE® ANALYTICS®, or any data collection system. The normalization module 114 identifies an interval within the collected data 116 that is considered "correct", meaning the variations of data points within the collected data 116 are within a pre-defined threshold. In some embodiments, the "correct" interval is identified based on a user input.

The normalization module 114 defines variations within the collected data 116. In some embodiments, the normalization module 114 subtracts sequential data points to define variations. In other embodiments, the normalization module 114 creates ratios based on arbitrary intervals of the collected data 116, such as monthly intervals. The normalization module 114 applies a cost function using the ratios and performs clustering in order to identify anomalies in the collected data 116. The normalization module 114 corrects the identified anomalies and generates the normalized data 118. The normalized data 118 may be displayed on the display 108.

The prediction module 120 accesses the normalized data 118 and removes any extreme data values. The prediction module 120 then further smoothes out the normalized data 118 in order to identify trending within normalized data 118, by finding a "best fit" line, wherein the slope of the best fit line defines the trend. The prediction module 120 applies seasonality to the trend and performs a prediction by extrapolating the linear trend and adding the seasonality. The prediction module 120 stores the prediction as prediction data 122. The prediction may be displayed on the display 108.

Figure 2:
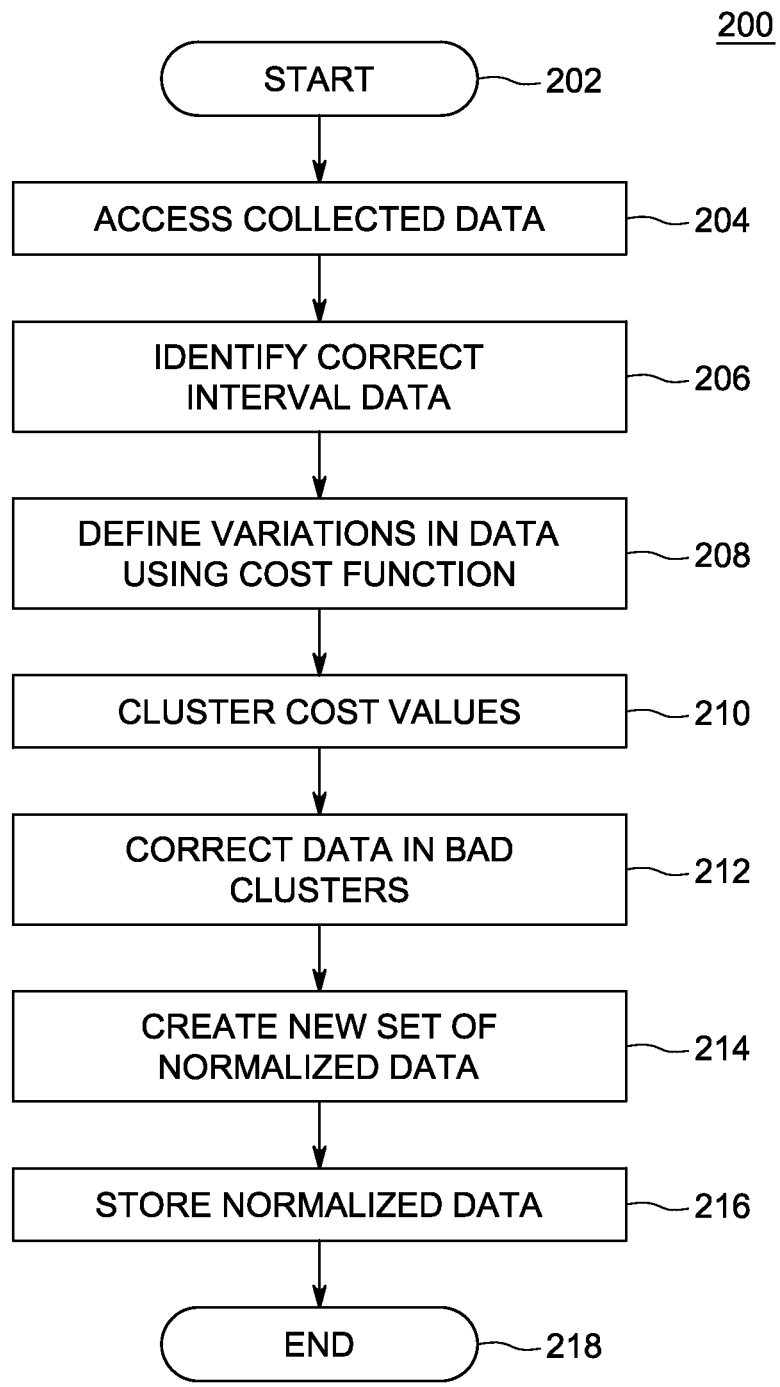
FIG. 2 depicts a flow diagram of a method for normalizing time series data as performed by the normalization module of FIG. 1, according to one or more embodiments.

FIG. 2 depicts a flow diagram of a method 200 for normalizing time series data as performed by the normalization module 114 of FIG. 1, according to one or more embodiments. The method 200 identifies anomalies in data and corrects the anomalies in a manner that maintains a trend the in data.

At step 204, the method 200 accesses a set of collected data. The data may be time series data collected over time, for example, collected daily over the course of a year. The method 200 proceeds to step 206, where the method 200 identifies an interval of data that is correct. The method 200 may identify an interval as correct where the variation in the data falls within a predefined interval (i.e., where no anomalies are found). In some embodiments, the method 200 identifies the interval as correct by receiving a user input identifying the data as correct. The goal of the invention is to bring the rest of the data close to the level found within this interval.

The method 200 proceeds to step 208, where the method 200 defines a variation in the data set. Variation is a difference between data points. Generally, variation within an interval is normal and the variation within the interval identified as correct is the variation that is considered allowable. In some embodiments, the method 200 calculates the variation by subtracting consecutive data points. However, if the number of data values is very large, for example, 365 values for a previous year, the method 200 calculates the variation by creating a set of ratios $r_i$ for intervals of data points $d_k$, for example:

$$r_i = \frac{d_{i+1}}{d_i}$$

The data points may be monthly averages for a previous year of data. For example, if the data represents daily viewership of a program over a year, the ratios may be created using the average viewership per month. The method 200 computes the ratios as February/January, March/February and so on to create a set of ratios.

The method 200 then applies a cost function using the ratios generating a cost $C_i$ for each ratio $r_i$ as follows:

$$C_i = (1 - r_i) + \left(1 - \frac{1}{r_i}\right)$$

Extreme cost values show anomalies in the data. The method 200 proceeds to step 210, where the method 200 clusters the cost values. The method 200 uses k-means clustering, which is a standard clustering algorithm known in the art, although other clustering algorithms may be used. Briefly, the method 200 selects a number of cost values ($C_i$), for example, 5 values. Each cost value represents a cluster. The method 200 iterates through every data point and for each data point, the method 200 adds that data point to the cluster with a cost value closest to the data point value. The method 200 computes an average for each cluster and repeats the clustering process. This algorithm converges very quickly. When two cost values differ by less than a pre-defined threshold, the method 200 stops clustering. The data points that appear most frequently will be in the same cluster. This results in a very large cluster of common values and a small cluster that contains anomalies.

The method 200 proceeds to step 212, where the method 200 corrects "bad clusters". Bad clusters refer to the clusters that contain anomalies. The method 200 selects a "correct cluster", which is the cluster that contains the data values of the "correct interval" identified in step 204 above. The method 200 finds the mean of the data values in the correct cluster and replaces all of the data values in the bad clusters with the mean value of the correct cluster.

The method 200 proceeds to step 214, where the method 200 creates a new set of normalized data from the corrected clusters. The method 200 recalculates the changed ratios ($r_i$) for the bad clusters. Using the cost value (C') of the cluster where the data values have been clustered. The changed ratio may be recalculated by solving for $r_i$ in the following:

$$C' = (1 - r_i) + \left(1 - \frac{1}{r_i}\right)$$

Starting with a data point ($nd_i$) located in the identified "correct interval" from step 206, the method 200 finds the new normalized values, where the new data value ($nd_k$) is calculated as follows:

$$nd_{i+1} = r_i * nd_i$$

The method 200 proceeds to step 216, where the method 200 stores the normalized data values. The method 200 proceeds to step 218 and ends.

FIGS. 3A-3G depict an illustration 300 of time series data that is normalized using collected data, according to one or more embodiments. In this exemplary embodiment, data is received from a web analytics system, for example, ADOBE® SITECATALYST®. The data represents time series data for video ad impressions (number of viewers who view an ad). The data is used to provide a deeper understanding of content and ad performance, specifically, how engagement translates directly to revenue and allows for targeting of individual sit visitor. Data prediction and forecasting help ensure that video publishers serve relevant and meaningful ads at premium costs to high-value visitors. Thus, the present invention corrects erroneously collected data to ensure accurate forecasting of video ad impressions.

Figure 3A:
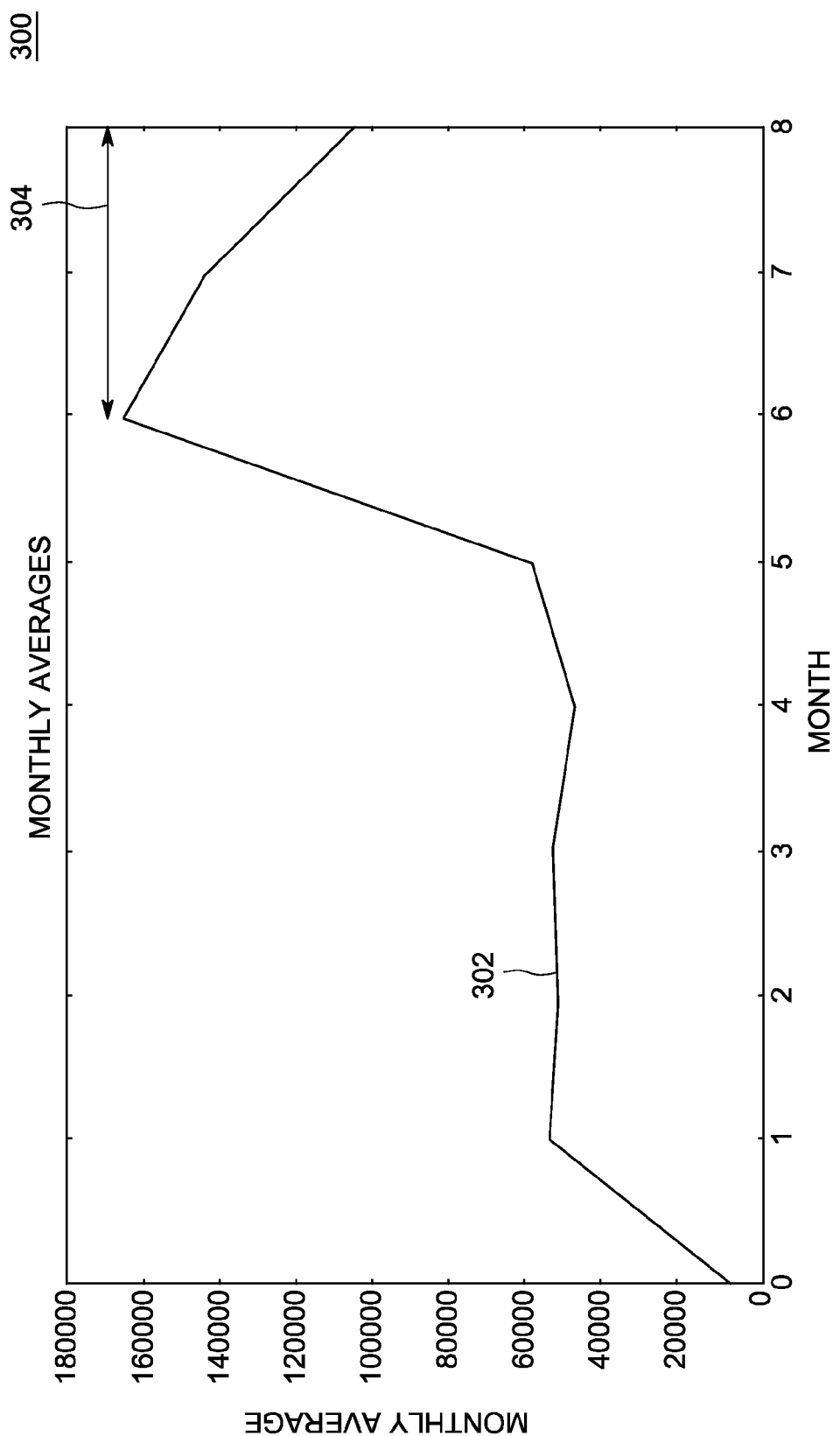
FIGS. 3A-3G depict an illustration of time series data that is normalized using collected data, according to one or more embodiments.

FIG. 3A illustrates how viewership on the y-axis changes as time changes on the x-axis. The time series data 302 represents monthly averages of viewer impressions for an 8 month period. The region identified by the arrow 304 is chosen as the interval with the correct data as described in step 206 of FIG. 2 above.

Figure 3B:
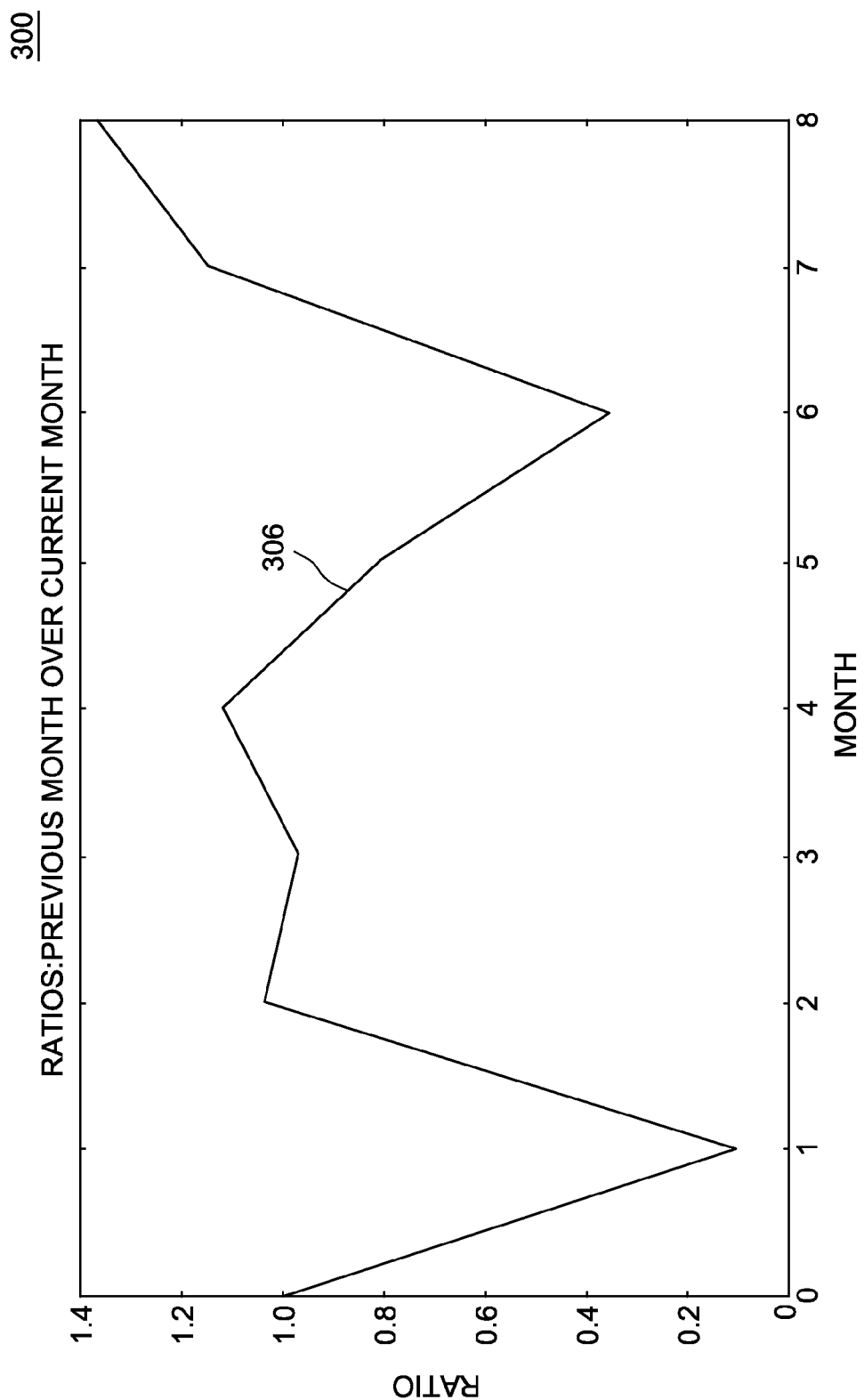

FIG. 3B illustrates the ratios of the values 306 of the monthly average of the current month divided by the value of the previous month as described in step 208 of FIG. 2 above.

Figure 3C:
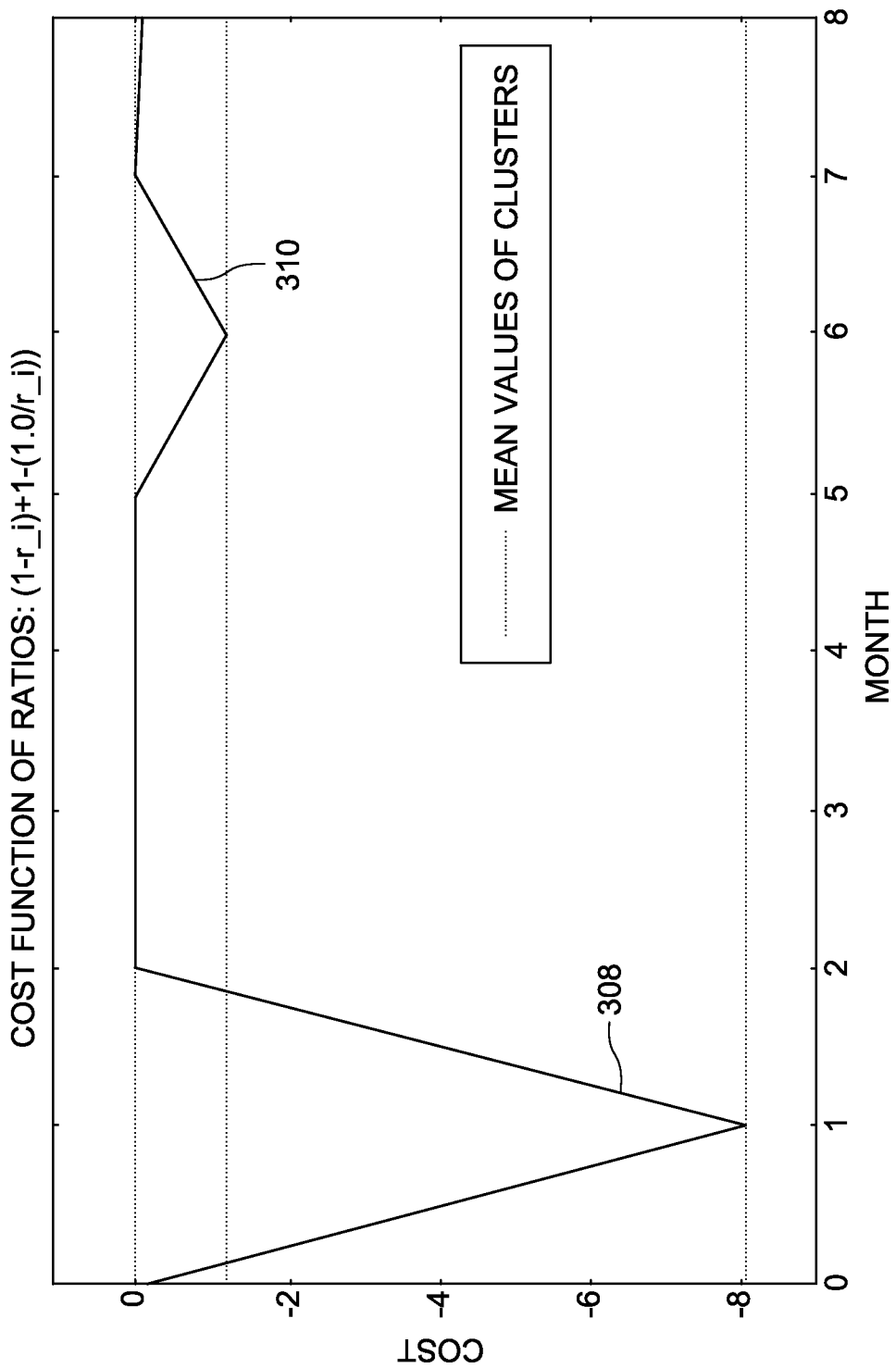

FIG. 3C illustrates the chosen cost function using the ratios from FIG. 3B and clusters the data points as described in step 210 of FIG. 2 above. The data is clustered into two clusters, 304 and 306. Cluster 304 is considered a bad cluster. Cluster 306 is a good cluster. The good cluster 306 contains the data values of the correct interval from FIG. 3A above.

Figure 3D:
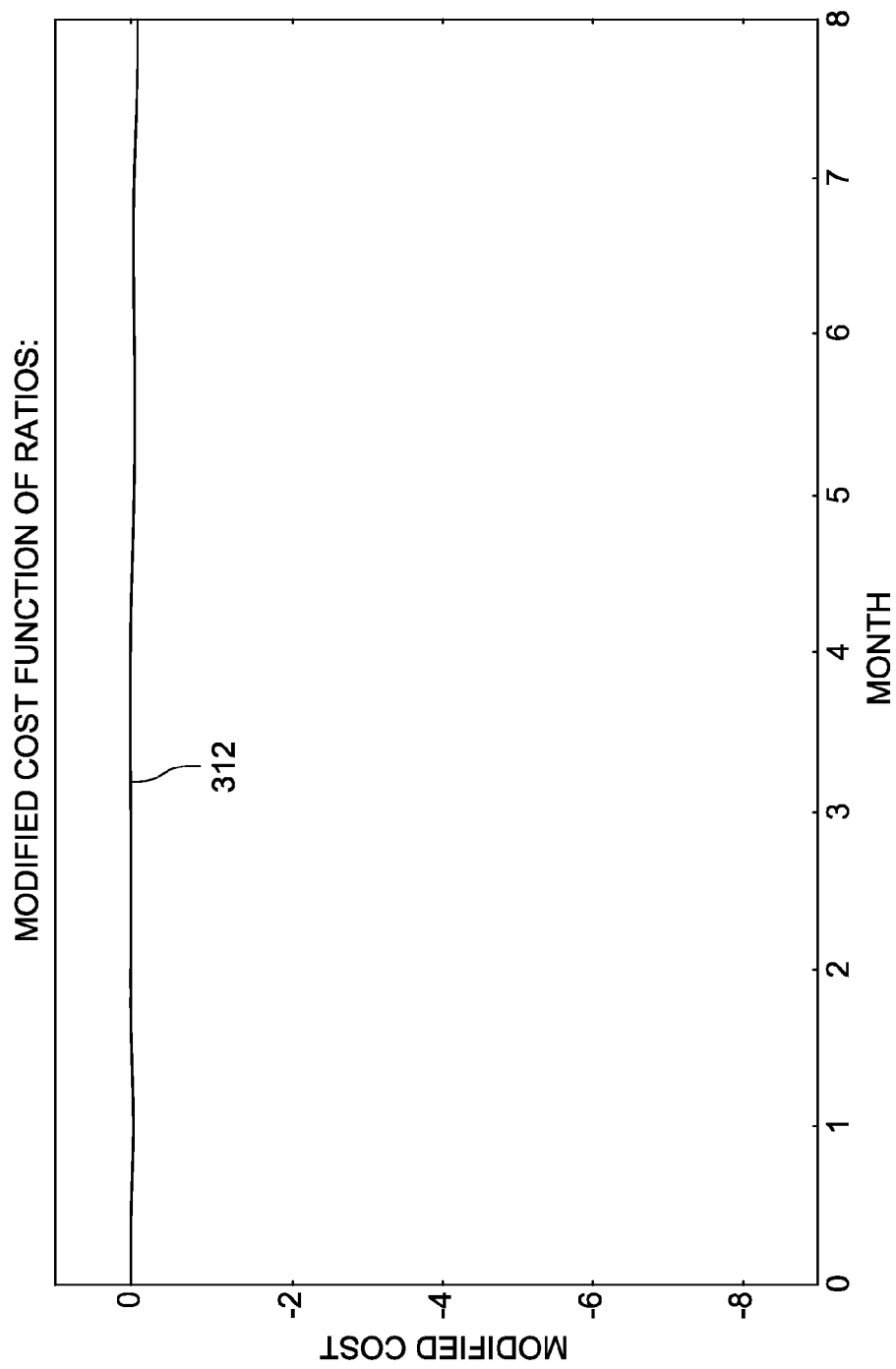

FIG. 3D illustrates how all of the data values in the bad cluster are brought into the good cluster by assigning the values 312 the mean value of the correct cluster as described in step 212 of FIG. 2 above.

Figure 3E:
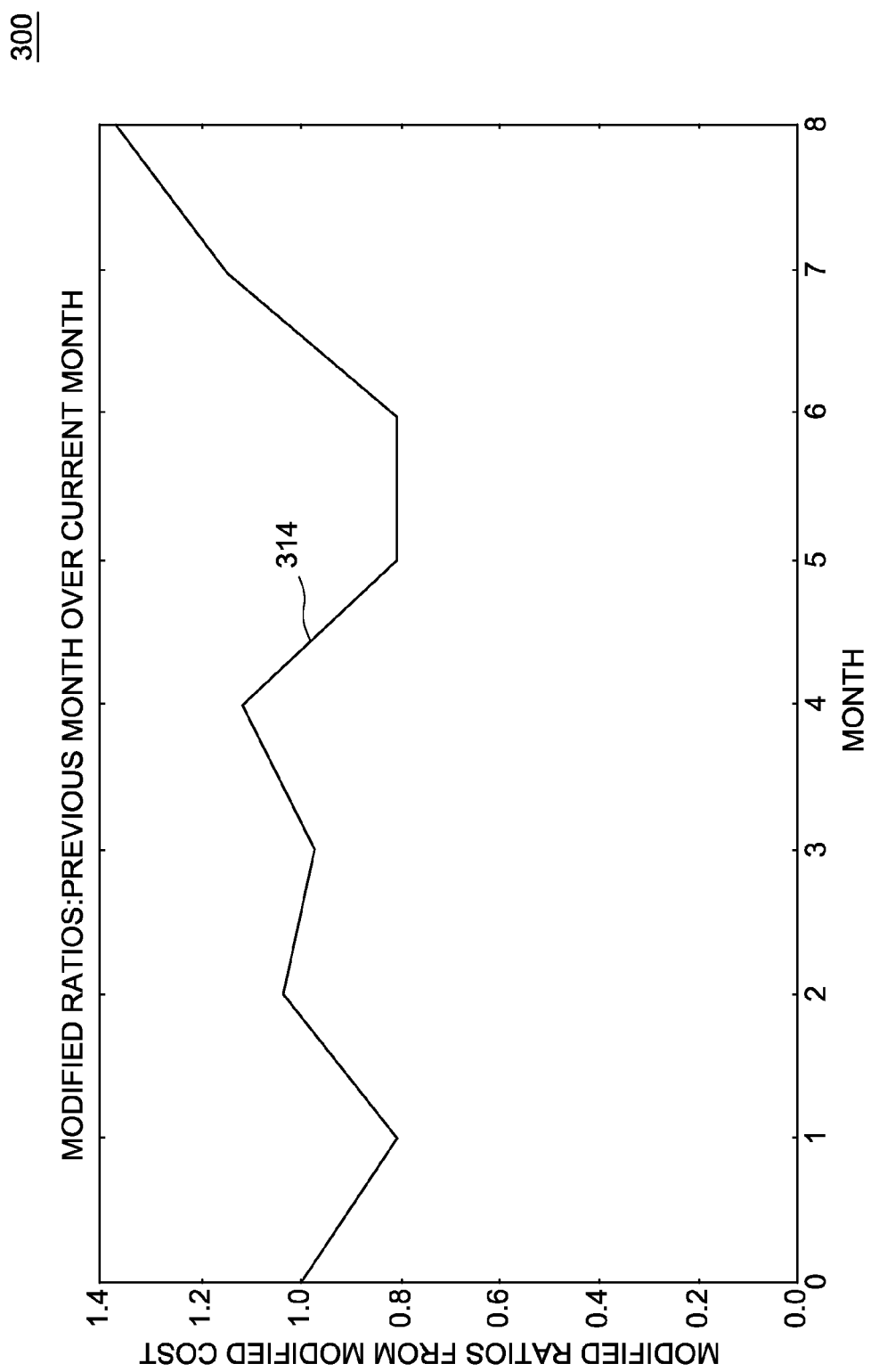

FIG. 3E illustrates the modified ratios 314 that have been calculated using the modified values of the cost function shown in FIG. 3D and described in step 214 of FIG. 2 above.

Figure 3F:
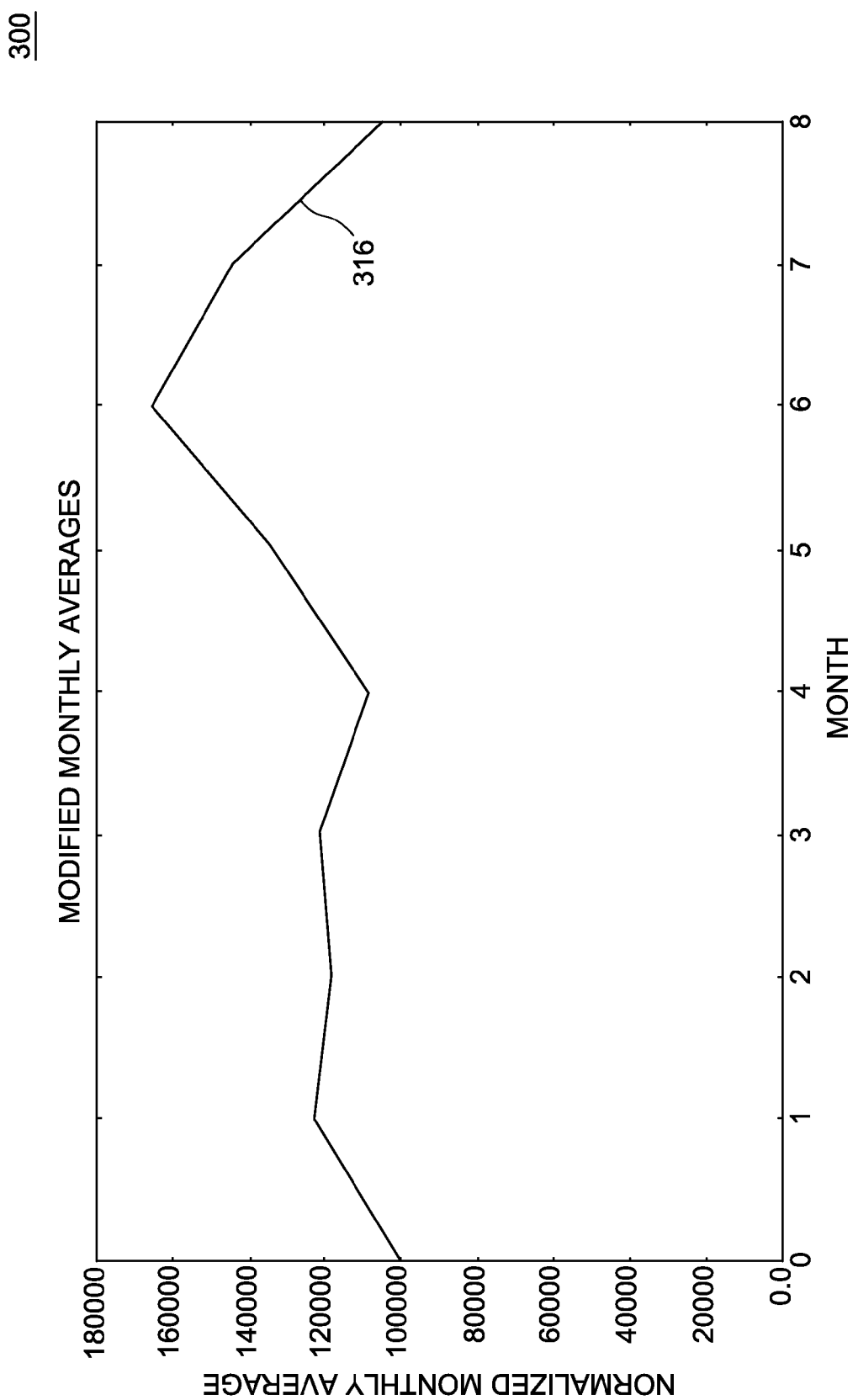

FIG. 3F illustrates the normalized monthly values 316 that have been recreated from the modified ratios of FIG. 3E above as described in step 214 of FIG. 2 above.

Figure 3G:
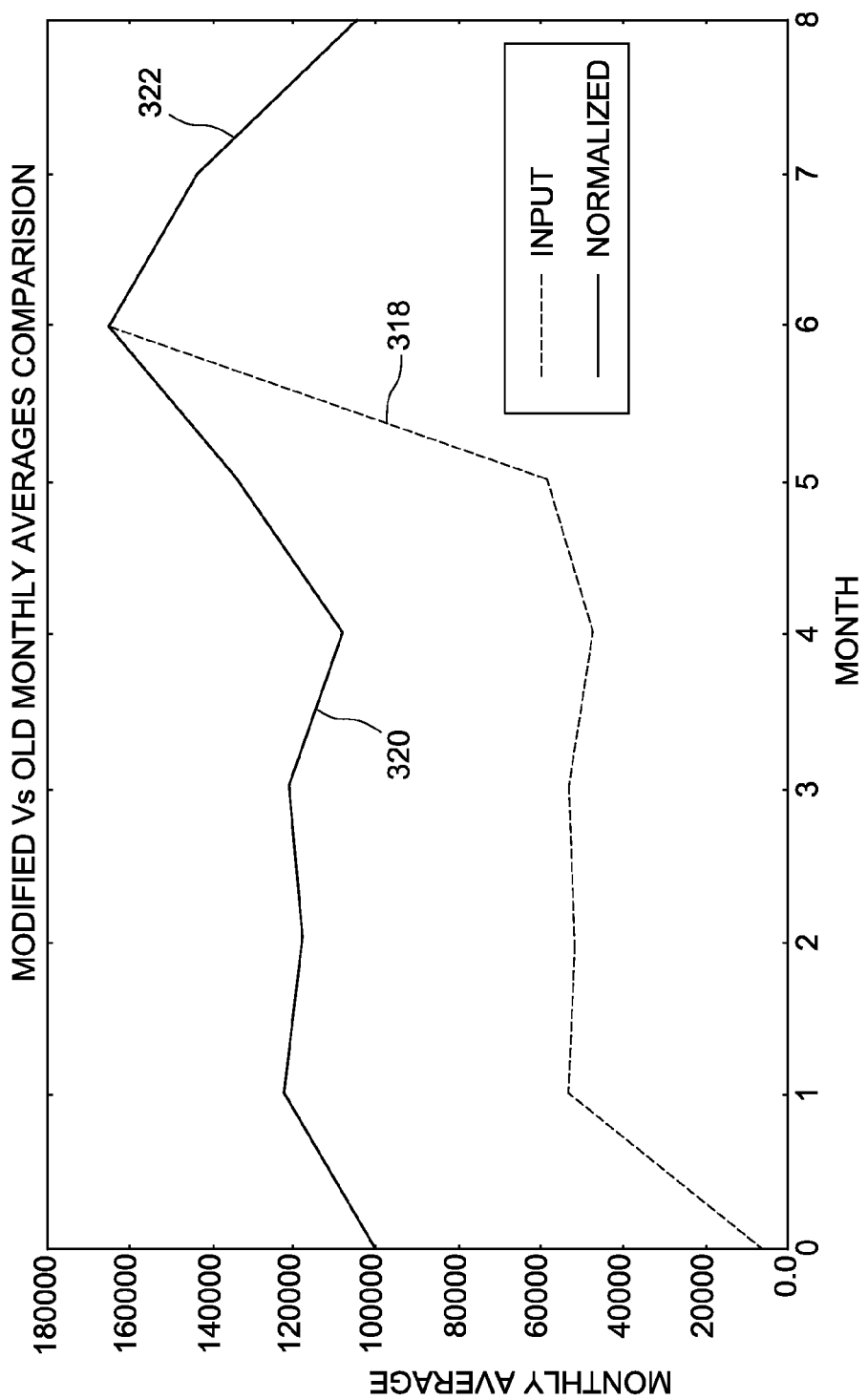

FIG. 3G illustrates a comparison of the original collected data 318 and the normalized data 320. The values 322 in what was identified as the correct interval are not changed. Although the normalized data values 320 are changed, they maintain the same trend (peaks and valleys) as the original data 318; however, the normalized data values 320 have less dramatic variations.

Figure 4:
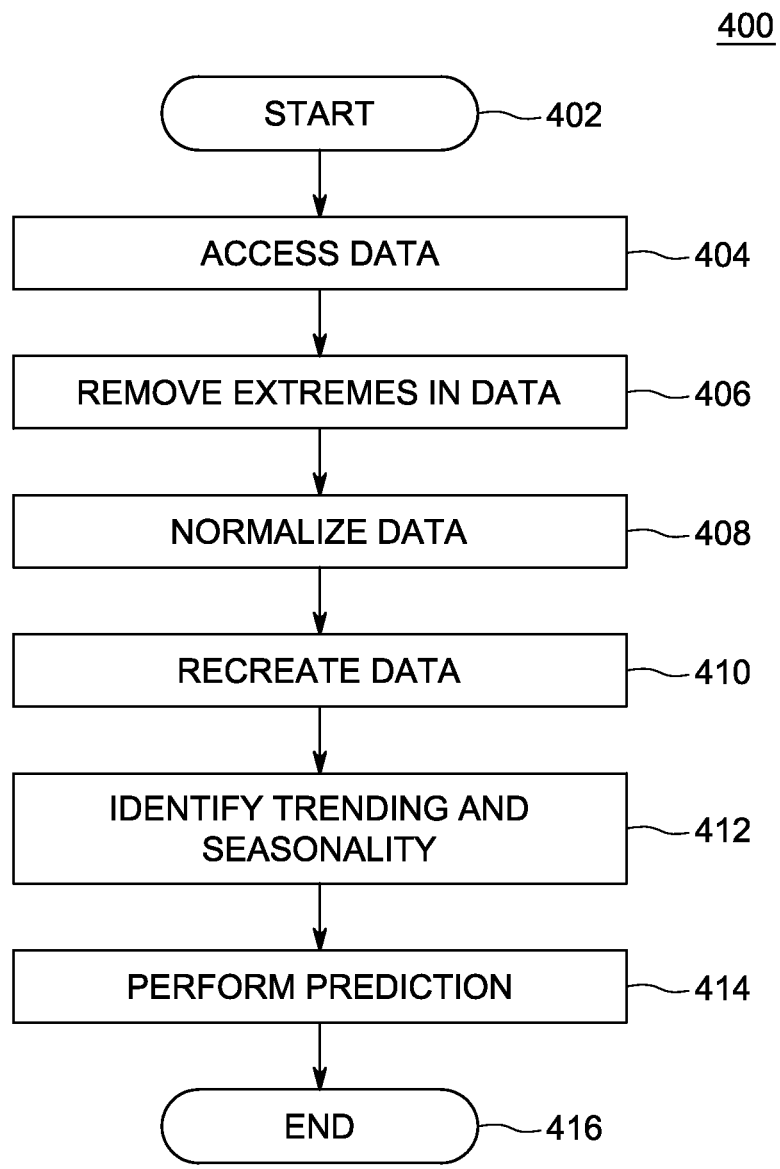
FIG. 4 depicts a flow diagram of a method for predicting using normalized data as performed by the prediction module of FIG. 1, according to one or more embodiments.

FIG. 4 depicts a flow diagram of a method 400 for predicting using normalized data as performed by the prediction module 120 of FIG. 1, according to one or more embodiments. The method 400 determines a trend in data and extrapolates the trend into the future.

The method 400 starts at step 402 and proceeds to step 404. At step 404, the method 400 accesses data. The data is time series data, for example a year's worth of data. The data may be normalized; however, if the data does not contain any unexplained anomalies, the data may be used without first being normalized.

The method 400 proceeds to step 406, where the method 400 removes extremes in the data set. As an example, suppose a prediction of viewership of a program is needed for the next 365 days based on one year's worth of normalized data. In one example, there is a strong weekly and annual seasonality, meaning that if viewership was strong during the first week of last year, there is likely to be strong viewership during the first week of this year. In other words, seasonal variation is the repetitive and predictable movement around a trend line.

The method 400 divides the normalized data into seven time series, one for each day of the week. For each day of the week, the method 400 applies a median filter for a pre-defined window, for example 4 days. The method 400 calculates a median for the first four Mondays. The method 400 then compares each Monday data value with the median. If any data value is more than, for example, three times the median or less than a third of the median, the data value is replaced with the median value. This removes any extreme one-day spikes or dips in the data.

The method 400 proceeds to step 408, where the method 400 normalizes the data. The method 400 generates a series, for example, m(t) containing the mean for each month. The means are normalized as provided in method 200 above. This yields a normalized monthly average series m'(t). The "correct interval" is the last value of m(t) (i.e., the most recent month).

The method 400 proceeds to step 410, where the method 400 recreates finer resolution data using the normalized series m'(t). The method 400 splits the normalized series m'(t) into a daily series by assigning a value to each data point of the week in the same ratio as was present in the original series m(t). For example, if the method 400 is recreating values for viewership of a program for each day and there are n days in a month $m_k$, then the number of view in the month $m_k$ are $n*m(t=m_k)$. For a given day $m_d$ of the month, the fraction(f) of views is calculated as follows:

$$f=\text{views}(m_d)/n*m(t=m_k).$$

Thus the normalized views for the day $m_d$ is calculated as follows:

$$\text{norm}(m_d)=f*m'(t=m_k)$$

The method 400 proceeds to step 412, where the method 400 identifies trending and seasonality in the normalized data. The method 400 applies a best fit line (mt+c) using, for example, a least square fit to obtain the line parameters m and c. The slope m is the trend. Seasonality is the difference of the data from this fitted line.

The method 400 proceeds to step 414, where the method 400 performs the prediction. The method 400 extrapolates the linear trend. The prediction maintains the continuity with the previous historic values so that the prediction line is a continuation of the historical data. After extrapolating the linear trend, the method 400 replicates the weekly seasonality found in the last 28 days over the entire prediction period.

The method 400 proceeds to step 416 and ends.

Figure 5A:
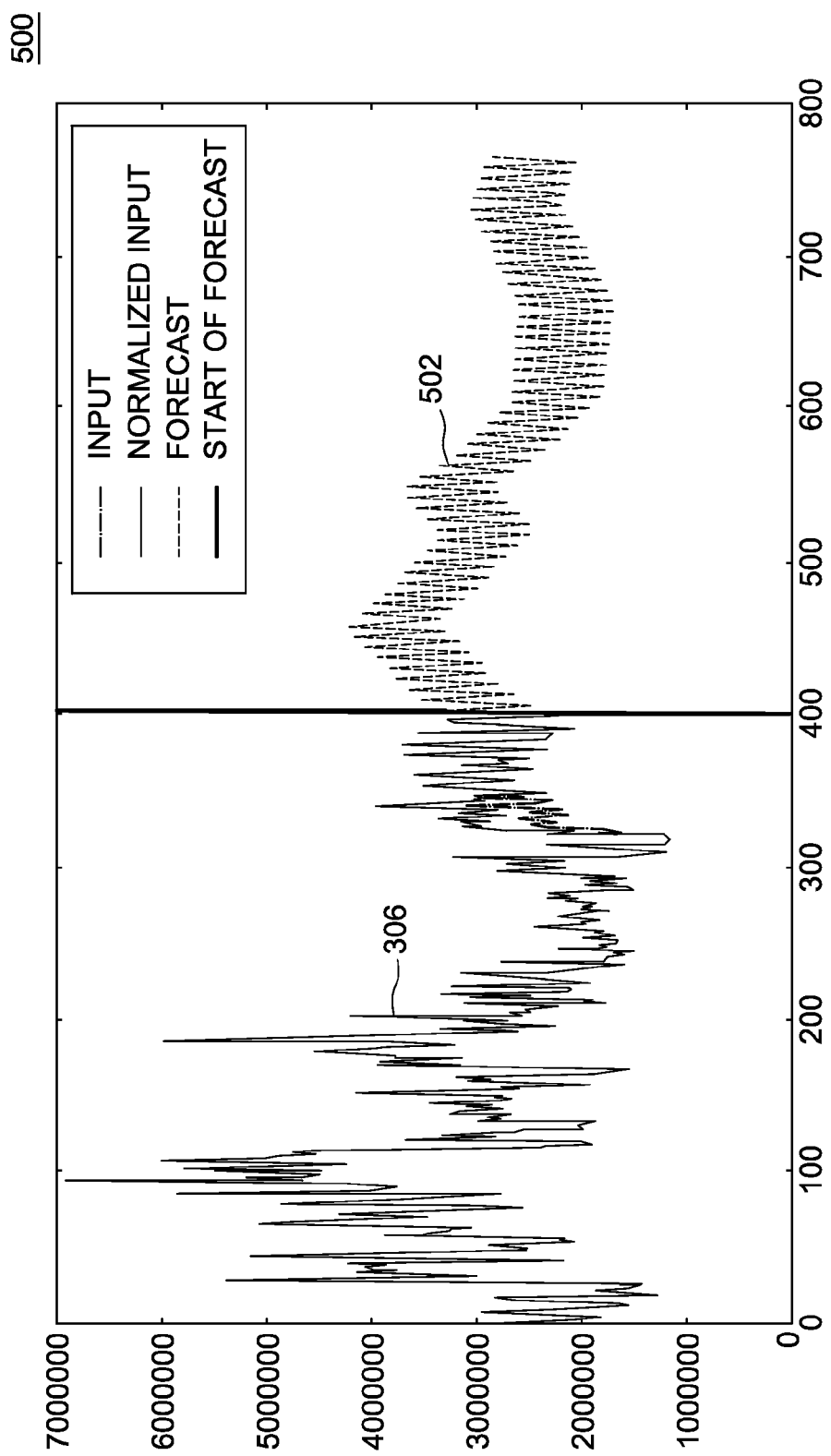
FIGS. 5A-5C depict illustrations 500 of predicted trends, according to one or more embodiments.
Figure 5B:
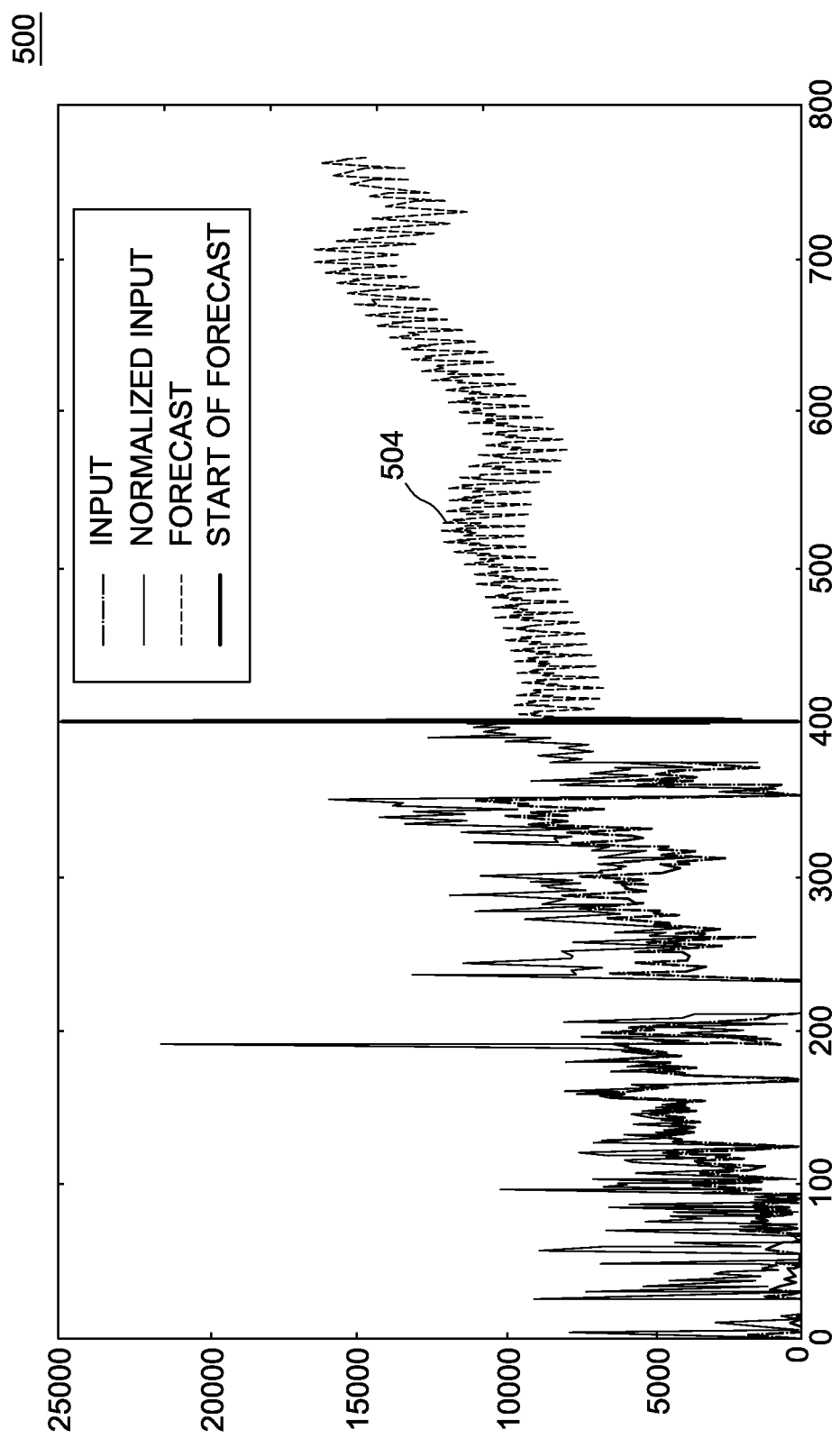
Figure 5C:
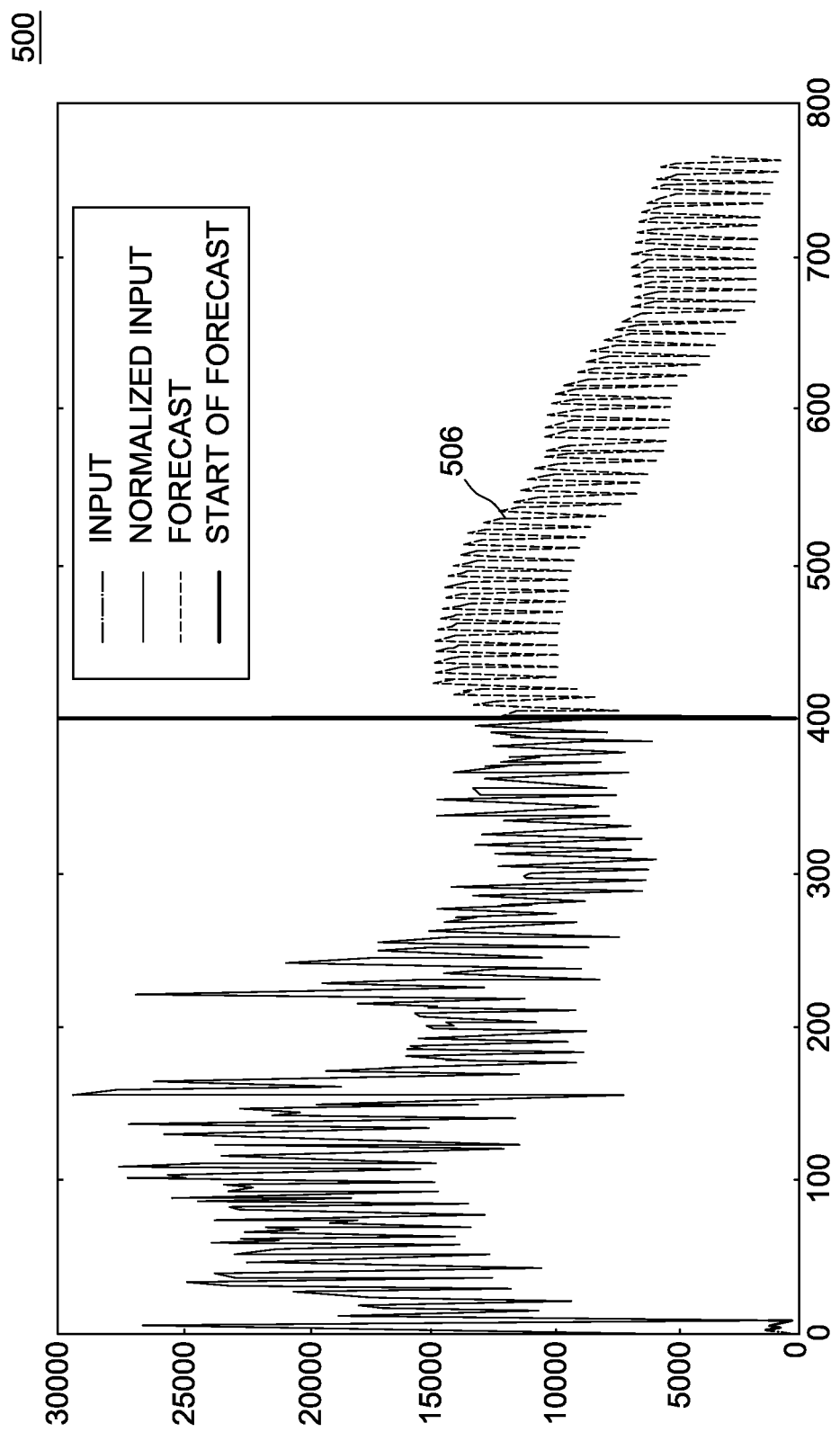

FIGS. 5A-5C depict illustrations 500 of predicted trends, according to one or more embodiments.

FIG. 5A illustrates how viewership on the y-axis changes as time changes on the x-axis. The normalized viewership values 501 are used to predict viewership for a prediction period. The prediction 502 maintains the same trend as the normalized data 501 and extrapolates the trend with added seasonality in the prediction 502.

FIG. 5B illustrates a prediction 504 of a rising trend.

FIG. 5C illustrates a prediction 506 of a falling trend.

The embodiments of the present invention may be embodied as methods, apparatus, electronic devices, and/or computer program products. Accordingly, the embodiments of the present invention may be embodied in hardware and/or in software (including firmware, resident software, microcode, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
   accessing website visitor data, the website visitor data comprising a plurality of time-series intervals, wherein each of the time-series intervals reflect a period of time that a website is available to receive visitors;
   determining, by at least one processor and using a cost function, a cost value for each time-series interval in the plurality of time-series intervals, wherein the cost function compares website visitor data from at least two time-series intervals;
   organizing, by the at least one processor, the determined cost values into multiple cost value clusters using a clustering algorithm;
   identifying at least one cost value cluster from the multiple cost value clusters by identifying at least one typical cost value cluster based on user input;
   identifying, by the at least one processor, one or more anomalous clusters from the multiple cost value clusters, the one or more anomalous clusters representing at least one anomaly in the website visitor data;
   modifying at least one cost value corresponding to the at least one anomaly in the website visitor data based on the at least one cost value cluster, wherein modifying the at least one cost value comprises:
      generating a mean cost value from the at least one typical cost value cluster, and
      replacing the at least one cost value corresponding to the at least one anomaly with the mean cost value;
   creating, by the at least one processor, a set of normalized data from the at least one modified cost value by applying the cost function to the modified at least one cost value;
   predicting website visitor data for a future time-series interval based on the set of normalized data; and
   selecting, by the at least one processor, a digital advertisement for the website using the predicted website visitor data.

2. The method of claim 1, further comprising:
   calculating the website visitor data from an initial set of data, wherein the website visitor data comprises mean data values for each of the plurality of time-series intervals calculated from the initial set of data;
   creating finer resolution data values based on the set of normalized data by comparing the set of normalized data with the initial set of data;
   identifying trending and seasonality in the created finer resolution data values; and
   predicting website visitor data values for the future time-series interval based on the identified trending and seasonality.

3. The method of claim 2,
   wherein identifying trending comprises determining a slope of a best fit line through the created finer resolution data values, and
   wherein identifying seasonality comprises determining the difference between the created finer resolution data values and the best fit line.

4. The method of claim 1, wherein the cost value for each time-series interval is a measure of variation in the website visitor data between the time-series interval and a different time series interval.

5. The method of claim 1, further comprising providing a user with the predicted website visitor data for consideration in setting a digital website advertising policy.

6. The method of claim 1, wherein determining the cost value comprises calculating the cost value, $C_i$, for a time series interval, i, based on a ratio, $r_i$, according to the cost function:

$$C_i = (1 - r_i) + \left(1 - \frac{1}{r_i}\right),$$

wherein $r_i$, is the ratio of a mean data value from the website visitor data corresponding to the time-series interval, i, and a mean data value from the website data corresponding to a previous time-series interval.

7. The method of claim 1, further comprising:
   providing the digital advertisement for display via the website based on the predicted website visitor data.

8. A system comprising:
   at least one processor; and
   at least one non-transitory computer readable storage medium storing instructions thereon that, when executed by the at least one processor, cause the system to:
   access website visitor data comprising a plurality of time-series intervals, wherein each of the time-series intervals reflect a period of time that a website is available to receive visitors;
   determine, using a cost function, a cost value for each time-series interval in the plurality of time-series intervals, wherein the cost function compares website visitor data from at least two time-series intervals;
   organize the determined cost values into multiple cost value clusters using a clustering algorithm;
   identify at least on cost value cluster from the multiple cost value clusters by identifying at least one typical cost value cluster based on user input;
   identify one or more anomalous clusters from the multiple cost value clusters, the one or more anomalous clusters representing at least one anomaly in the website visitor data;
   modify at least one cost value corresponding to the at least one anomaly in the website visitor data based on the at least one cost value cluster by performing steps comprising:
      generating a mean cost value from the at least one typical cost value cluster; and
      replacing the at least one cost value corresponding to the at least one anomaly with the mean cost value;
   create a set of normalized data from the at least one modified cost value by applying the cost function to the modified at least one cost value;
   predict website visitor data for a future time-series interval based on the set of normalized data; and
   select a digital advertisement for the website using the predicted website visitor data.

9. The system of claim 8, further comprising instructions that, when executed by the at least one processor, cause the system to:
   create finer resolution data values based on the set of normalized data;
   identify trending and seasonality in the created finer resolution data values; and predict website visitor data values for the future time-series interval based on the identified trending and seasonality.

10. The system of claim 9, wherein:
the instructions that, when executed by the at least one processor, cause the system to identify trending by performing steps comprising determining a slope of a best fit line through the created data values.

11. The system of claim 9, wherein the instructions that, when executed by the at least one processor, cause the system to identify seasonality by performing steps comprising determining the difference between the created finer resolution data values and the best fit line.

12. The system of claim 8, further comprising instructions that, when executed by the at least one processor, cause the system to set a plurality of policies for digital website advertising using the predicted website visitor data, wherein setting the policy for digital website advertising comprises: setting a cost of digital advertising on a website, and setting policies for targeting digital advertising to individual website visitors.

13. The system of claim 8, wherein the instructions that, when executed by the at least one processor, cause the system to determine the cost values by performing steps comprising calculating a cost value, $C_i$, for a time series interval, i, based on a ratio, $r_i$, according to the cost function:

$$C_i = (1 - r_i) + \left(1 - \frac{1}{r_i}\right).$$

wherein, $r_i$, is the ratio of a mean data value from the website visitor data corresponding to the time-series interval, i, and a mean data value from the website data corresponding to a previous time-series interval.

14. A non-transitory computer readable medium storing instructions thereon that, when executed by at least one processor, cause a computer system to:
access website visitor data, the website visitor data comprising a plurality of time-series intervals, wherein each of the time-series intervals reflect a period of time that a website is available to receive visitors;
determine, using a cost function, a cost value for each time-series interval in the plurality of time-series intervals, wherein the cost function compares website visitor data from at least two time-series intervals;
organize the determined cost values into multiple cost value clusters using a clustering algorithm;
identifying at least one cost value cluster from the multiple cost value clusters by identifying at least one typical cost value cluster based on user input;
identify one or more anomalous clusters from the multiple cost value clusters, the one or more anomalous clusters representing at least one anomaly in the website visitor data;
modify at least one cost value corresponding to the at least one anomaly in the website visitor data based on the at least one cost value cluster by performing steps comprising:
generating a mean cost value from the at least one typical cost value cluster; and
replacing the at least one cost value corresponding to the at least one anomaly with the mean cost value;
create a set of normalized data from the at least one modified cost value by applying the cost function to the modified at least one cost value;
predict website visitor data for a future time-series interval based on the set of normalized data; and
select a digital advertisement for the website using the predicted website visitor.

15. The non-transitory computer readable medium of claim 14, further comprising instructions that, when executed by the at least one processor, cause the computer system to:
create data values based on the normalized data;
identify trending and seasonality in the created data; and
predict website visitor data values for the future time-series interval period based on the identified trending and seasonality.

16. The non-transitory computer readable medium of claim 15, wherein the instructions that, when executed by the at least one processor, cause the computer system to identify trending by performing steps comprising determining a slope of a best fit line through the created data values.

17. The non-transitory computer readable medium of claim 15, wherein seasonality is the difference between the created data values and the best fit line.

18. The non-transitory computer readable medium of claim 14, further comprising instructions that, when executed by the at least one processor, cause the computer system to: provide the digital advertisement for display via the website based on the predicted website visitor data.

19. The non-transitory computer readable medium of claim 14, wherein the instructions that, when executed by the at least one processor, cause the computer system to determine the cost values by performing steps comprising determining mean data values from the website visitor data for each time-series interval.

20. The non-transitory computer readable medium of claim 14, wherein the instructions that, when executed by the at least one processor, cause the computer system to determine the cost value by performing steps comprising calculating a cost value, $C_i$, for a time series interval, i, based on a ratio, $r_i$, according to cost function:

$$C_i = (1 - r_i) + \left(1 - \frac{1}{r_i}\right).$$

wherein, $r_i$, is the ratio of a mean data value from the website visitor data corresponding to the time-series interval, i, and a mean data value from the website data corresponding to a previous time-series interval.

* * * * *